US009830295B2

(12) United States Patent
Case et al.

(10) Patent No.: US 9,830,295 B2
(45) Date of Patent: Nov. 28, 2017

(54) RESOURCE DOMAIN PARTIONING IN A DATA PROCESSING SYSTEM

(71) Applicants: Lawrence L. Case, Austin, TX (US); Charles E. Cannon, Austin, TX (US); Simon J. Gallimore, Austin, TX (US); Glen G. Wienecke, Fredericksburg, TX (US)

(72) Inventors: Lawrence L. Case, Austin, TX (US); Charles E. Cannon, Austin, TX (US); Simon J. Gallimore, Austin, TX (US); Glen G. Wienecke, Fredericksburg, TX (US)

(73) Assignee: NXP USA, Inc., Austin, TX (US)

( * ) Notice: Subject to any disclaimer, the term of this patent is extended or adjusted under 35 U.S.C. 154(b) by 332 days.

(21) Appl. No.: 14/598,199

(22) Filed: Jan. 15, 2015

(65) Prior Publication Data

US 2016/0210260 A1   Jul. 21, 2016

(51) Int. Cl.

| G06F 13/00 | (2006.01) |
|---|---|
| G06F 3/00 | (2006.01) |
| G06F 13/36 | (2006.01) |
| G06F 13/40 | (2006.01) |
| G06F 9/50 | (2006.01) |

(52) U.S. Cl.
CPC ........ *G06F 13/4068* (2013.01); *G06F 9/5011* (2013.01)

(58) Field of Classification Search
None
See application file for complete search history.

(56) References Cited

U.S. PATENT DOCUMENTS

| 7,865,876 B2 | 1/2011 | Griffin et al. |
| 2004/0019722 A1 | 1/2004 | Sedmak |
| 2004/0243823 A1* | 12/2004 | Moyer ............ G06F 21/316 726/27 |
| 2011/0126265 A1* | 5/2011 | Fullerton ........... G06F 21/53 726/4 |

FOREIGN PATENT DOCUMENTS

EP   0321724 B1   9/1997

* cited by examiner

*Primary Examiner* — David E Martinez (57) ABSTRACT

A resource domain controller in a data processing system stores information that is used to group various resources, such as bus masters and peripherals, into common domains. Each group can be referred to as a resource domain and can include one or more data processor and peripheral devices. The resource domain information is then used to determine whether a particular access request from a data processor is authorized to access its intended target, e.g., one of the peripheral devices, by determining whether the access request and the intended target each belong to a common resource domain. If so, the access request is allowed, otherwise the access request is prevented from being successfully completed.

17 Claims, 7 Drawing Sheets

RESOURCE DOMAIN PARTIONING IN A DATA PROCESSING SYSTEM

BACKGROUND

Field of the Disclosure

The present disclosure relates generally to data processing systems and methods, and more particularly to restricting access to peripheral devices from data processors.

Description of the Related Art

Data processing systems generally include data processors and peripheral devices. Data processors can generate access requests to read or write information at a peripheral device. Depending upon the particular application or application team, it may or may not be desirable for a given data processor to be able to access a particular peripheral. Because data processor are typically designed to be generic enough for use across multiple applications, a dynamic ability to configure the manner in which data processors are allowed to access various peripherals, or more importantly prevent access to various peripherals, is desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

In accordance with an embodiment of the present disclosure, a resource domain controller in a data processing system includes information that groups various resources, such as bus masters and peripherals, into common domains. Each group can be referred to as a resource domain and can include one or more data processor and peripheral devices. The resource domain information, therefore, assigns data processors and peripherals of a data processing system to one or more resource domains. Access requests generated by a particular data processor are also said to belong to the same resource domain(s) as the requesting data processor. The resource domain information is then used to determine whether a particular access request from a data processor is authorized to access its intended target, e.g., one of the peripheral devices, by determining whether the access request and the intended target each belong to a common resource domain. If so, the access request is allowed, otherwise the access request is prevented from being successfully completed. The manner in which resource domains are used to restrict access to peripheral devices will be better understood with reference to FIGS. 1-12 herein.

Figure 1:
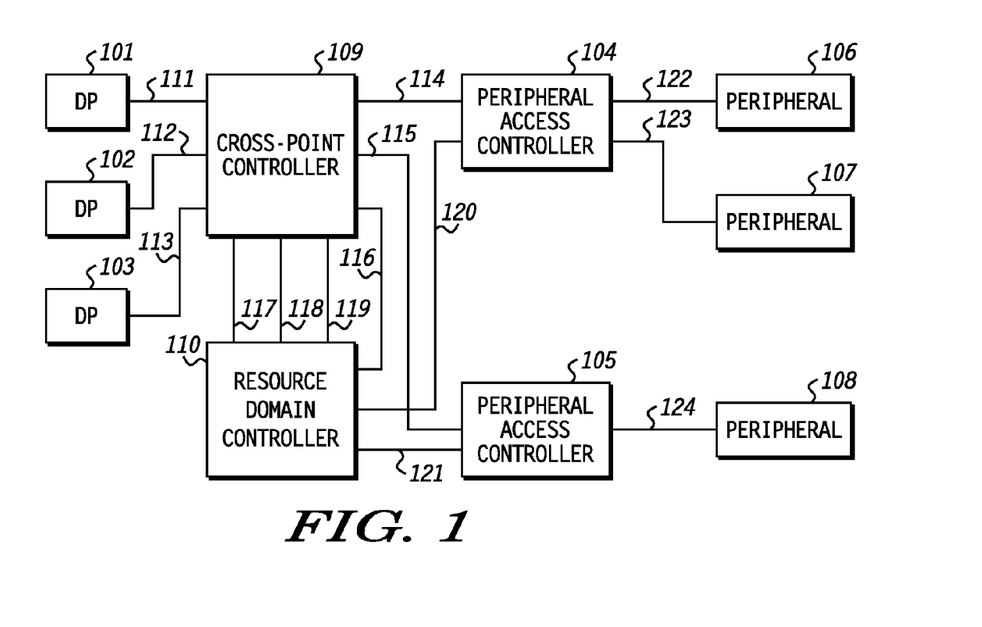
FIG. 1 illustrates a block diagram of a data processing system in accordance with a specific embodiment of the present disclosure.

FIG. 1 illustrates an embodiment of a data processing device 100 having data processors (DP) 101-103, peripheral access controllers 104-105, peripheral devices 106-108, cross-point controller 109, and resource domain controller (RDC) 110. Data processors 101-103 are connected to cross-point controller 109 via interconnects 111-113, respectively. Resource domain controller 110 is connected to cross-point controller 109 via interconnects 116-119, wherein there is a one-to-one relationship between interconnects 117-119 and the data processors 101-103, as will be discussed in greater detail herein. Resource domain controller 110 is also connected to peripheral access controllers 104 and 105 via interconnects 120 and 121, respectively. Cross-point controller 109 is connected to peripheral access controllers 104 and 105 via interconnects 114 and 115, respectively. Peripheral access controller 104 is connected to peripheral devices 106 and 107 via interconnects 122 and 123, respectively. Peripheral access controller 105 is connected to peripheral device 108 via interconnect 124.

Data processing device 100 can be an integrated circuit die, a packaged device including one or more integrated circuit dies, a printed circuit board including one or more package devices, the like, and combinations thereof. For purposes of discussion, it is presumed that data processing device 100 is an integrated circuit die that contains a plurality of devices, including data processors 101-103, peripheral access controllers 104-105, peripheral devices 106-108, cross-point controller 109, peripheral devices 106-108 and resource domain controller 110.

The term "interconnect" as used herein is intended to mean a device that communicates information between other devices. An interconnect can be implemented as a passive device, such as one or more transmission paths that transmit signals between various devices along conductive lines without their being saved, or as an active device that buffers, e.g., stores, data being transmitted via conductive lines; for example, an active interconnect communicates information between devices by first storing the information and retrieving information when needed. For example, an active interconnect can transmit data via a first-in first-out memory or other memory device. A passive device with respect to an interconnect includes a conductive line, wherein the conductive line can include buffering components, such as an inverter or other transistor based structure, that serves the purpose of isolating or amplifying a signal being transmitted, but does not store the signal for later retrieval. For purposes of discussion, unless otherwise stated, all interconnects are presumed to be implemented using conductive lines.

During operation, data processing system 100 controls access requests from data processors 101-103 to peripheral devices 106-108 through the use of resource domains, each of which identifies a logical collection of data processors and peripheral devices. An access request from a data processor to access a peripheral device will be allowed to proceed only when the data processor and the peripheral device are members of a common resource domain. An access request from a data processor to a peripheral device will not be allowed to complete successfully when the data processor and the peripheral device are not members of a common resource domain. In an embodiment, each respective data processor and peripheral device can be a member of a plurality of resource domains. In another embodiment, each data processor belongs to a single resource domain, while peripherals can belong to a plurality of resource domains.

The resource domain membership information for each data processor and peripheral of system 100 can be provided by a user, e.g., an application, to the resource domain controller 110 via interconnect 116 for storage during an initialization procedure. It will be appreciated that the initialization procedure should be a secure procedure. After initialization, access requests generated by data processors 101-103 to access peripheral devices 106-108 are received at cross-point controller 109, via interconnects 111-113. In addition, cross-point controller 109 receives resource domain information from resource domain controller 110 via interconnects 117-119. Resource domain information identifies the resource domains associated with each one of data processors 101-103, respectively.

For each access request it receives, cross-point controller 109 will forward a corresponding downstream access request to a peripheral access controller that is connected to the peripheral being accessed, i.e., the target peripheral. For example, the cross-point controller 109 can determine the appropriate peripheral access controller to receive the corresponding downstream access request based on the address of the received access request. The downstream access request provided by the cross-point controller 109 includes not only the address and control information of the received request but also includes resource domain membership information of the data processor that is the source of the access request, i.e., the source data processor. Operation of cross-point controller 109 will be better understood with reference to FIG. 2.

Figure 2:
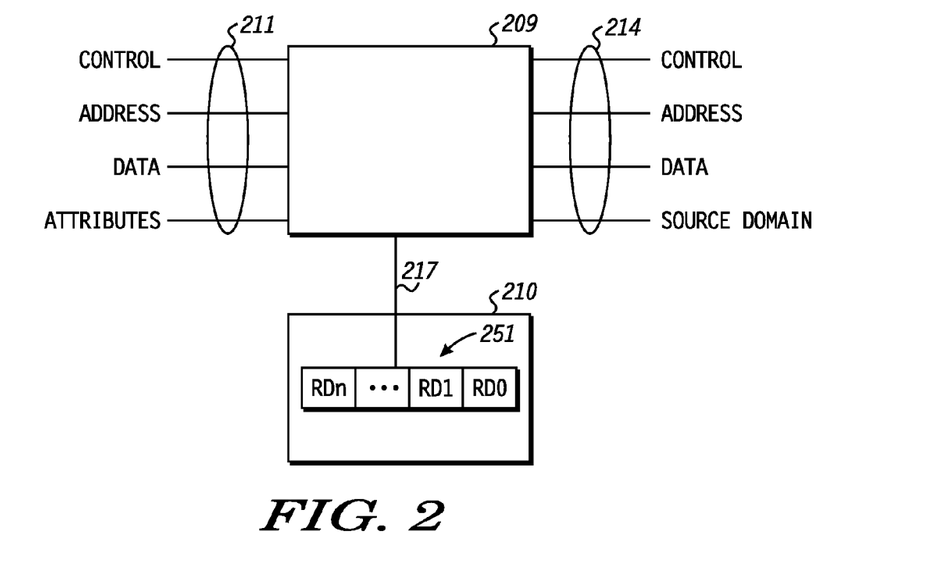
FIG. 2 illustrates a specific embodiment of a portion of FIG. 1 in greater detail.

FIG. 2 illustrates a cross-point controller 209, interconnects 211, 214, and 217, which are particular embodiments of cross-point controller 109, and interconnects 111, 114, and 117, respectively. Interconnect 211 represents a plurality of interconnects including interconnects labeled CONTROL, ADDRESS, DATA, and ATTRIBUTES that communicate access request information between data processor 101 and cross-point controller 109. Interconnect 214 represents a plurality of interconnects including interconnects labeled CONTROL, ADDRESS, DATA, and SOURCE DOMAIN that communicate downstream access request information between cross-point controller 109 and peripheral access controller 104. The CONTROL, ADDRESS, AND DATA information at interconnect 214 correspond to information received at the CONTROL, ADDRESS and DATA interconnects 211, and the SOURCE DOMAIN of interconnect 214 corresponds to resource domain attribute information received from the resource domain controller 210, as will be described in greater detail below.

According to an embodiment, interconnect 217 represents a plurality of conductive lines that are connected to a corresponding plurality of fields of a register 251. Register 251 is a portion of the resource domain controller 210 that stores resource domain membership information for data processor 101. In particular, register 251 includes a plurality of fields, labeled RD0-RDn corresponding to each one of the plurality of possible resource domains to which data processor 101 can belong. According to an embodiment where data processor 101 can only belong to a single resource domain, only a single one of the fields RD0-RDn can be asserted. In an alternate embodiment where the data processor 101 can belong to multiple resource domains, multiple ones of the fields RD0-RDn can be asserted to indicate the resource domain membership. It will be appreciated that other ways of representing domain identifiers of data processor 101 can be used, for example, a two-bit domain identifier can be stored at a register associated with data processor 101 to identify one of four possible resource domains when only a single resource domain can be associated with a particular data processor. It will further be appreciated that additional registers similar to register 251 reside at the resource domain controller 110, one for each one of the data processors 102 and 103.

Thus, in operation, assuming the target of an access request is to one of either peripheral 106 or 107, the cross-point controller 209 will forward control, address, and data information from interconnect 211, and resource domain information from interconnect 217 to interconnects CONTROL, ADDRESS, DATA, and SOURCE DOMAIN of interconnect 214, respectively. Information received from the data processor at the ATTRIBUTE interconnect is not needed by the system to qualify received access requests based upon resource domains, and therefore is not illustrated as a downstream interconnect from cross-point controller 209 in FIG. 2. For example, a source identifier that uniquely identifies data processor 101 is an example of an attribute that can be provided from data processor 101. However, since such a source identifier is not needed to qualify accesses based on source domains, as disclosed herein, a corresponding ATTRIBUTE interconnect is not illustrated as provided down stream. It will be appreciated, however, that the cross-point controller 209 may actually provide source identifier information to downstream ATTRIBUTE interconnects for other purposes, such as to support other circuitry that can also qualify access requests.

Referring to FIG. 1, in addition to receiving downstream access requests from the cross-point controller 109, each one of the peripheral access controllers 104-105 also receives resource domain membership information for each of its peripherals from resource domain controller 110 via interconnects 120-121, respectively. For example, peripheral access controller 104 would receive resource domain membership information for peripherals 106 and 107 from resource domain controller 110 via interconnect 120, while peripheral access controller 105 would receive resource domain membership information for peripheral 108 via interconnect 121.

Figure 3:
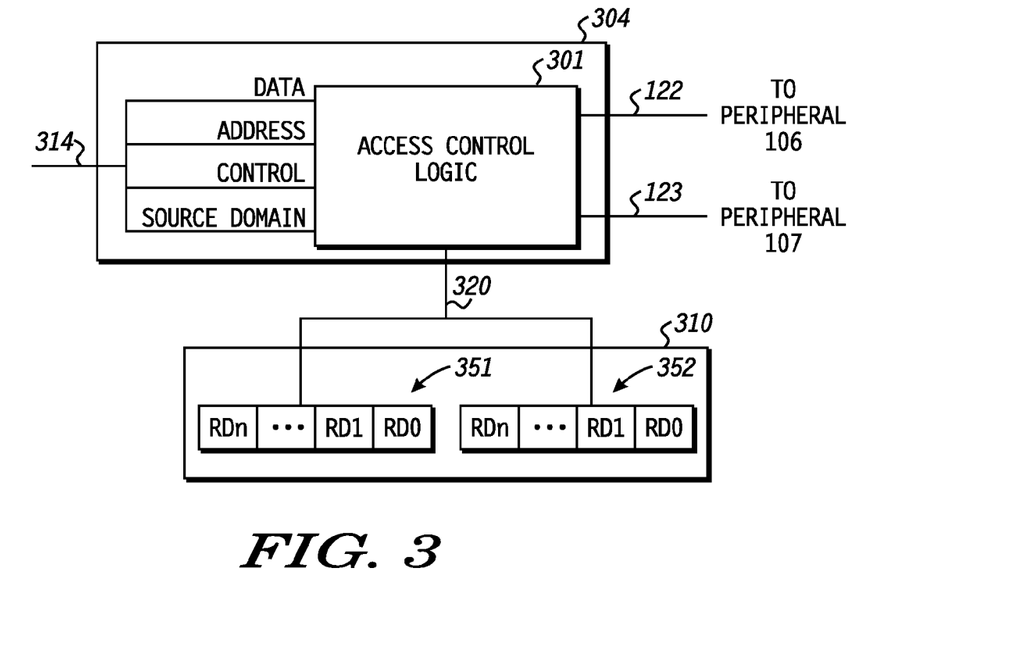
FIG. 3 illustrates a specific embodiment of a portion of FIG. 1 in greater detail.

The peripheral access controller receiving a downstream access request from the cross-point controller uses the resource domain membership information of the source access request and the resource domain membership information of the target peripheral to determine whether to allow or prevent the access request, and will be better understood in reference to FIG. 3, which illustrates a peripheral access controller 304, a resource domain controller 310, and interconnects 314 and 320, which are particular embodiments of peripheral access controller 104, resource domain controller 110, and interconnects 114 and 120, respectively.

Peripheral access controller 304 receives downstream access requests on interconnect 314. As described previously, access requests provided to peripheral access controllers comprise CONTROL, ADDRESS, DATA and SOURCE DOMAIN information. Peripheral access controller 304 is connected to interconnect 320 to receive resource domain membership for each one of its downstream peripherals. In the embodiment of FIG. 3, interconnect 320 includes a plurality interconnects, one connected to each field of the registers 351 and 352, which store resource domain membership information for peripheral device 106 and peripheral device 107, respectively. For example, register 351 is associated with peripheral 106 and includes a plurality of fields corresponding to each possible resource domain to which peripheral 106 can belong. Thus, interconnect 320 includes a plurality of conductive lines that connect each field of registers 351 and 352 to the access control logic 301 of the peripheral control module 304.

Access control logic 301 compares the resource domain membership information received via interconnect 320 for a peripheral device being accessed to the SOURCE DOMAIN information of a current access request to determine if the access request and the target peripheral are members of a common resource domain. If so, access control logic 301 allows the access request to proceed, and, therefore, provides an access request to interconnect 122 or 123, depending upon the target peripheral. Otherwise, if there is not a common resource domain between the access request and the target peripheral, access control logic 301 prevents the access request, and can provide an indication on interconnect 314 indicating that the access request was prevented. This indication can be returned through cross-point controller 109 to the data processor making the request. The data processor can then take corrective action. In embodiments, corrective actions can include reporting an error to a user, logging an error indication in a log file and requesting a modification to resource domain membership configuration from supervisory software such as an operating system or the like.

It will be appreciated that the term "prevent" with respect to an access request is intended to mean that some action is taken that prevents the access request from being successfully completed. For example, data being written is not stored, or data being read is not returned to a requesting source. This can be accomplished in a number of different ways, including: not propagating a request to a destination; not propagating retrieved data to a requesting source; and the like. It will also be appreciated that the term "allow" with respect to an access request meeting a particular criteria, such as a resource domain criteria, is intended to mean that the access request met the criteria and made available for subsequent processing. It will be appreciated, however, that during the subsequent processing that another access criteria may ultimately prevent the access request.

By way of example, referring to FIG. 1, system device 100 can represent a wireless communication system, where data processor 101 is a general-purpose instruction-based data processor performing user interface functions, data processor 102 is a general-purpose instruction-based data for performing baseband radio functions, peripheral device 106 is a touch screen controller, peripheral device 107 is a radio transceiver, and peripheral device 108 is a memory element. Resource domain controller 110 can be configured to define two resource domains. A first resource domain includes data processor 101 and peripheral devices 106 and 108. A second resource domain includes data processor 102 and peripheral devices 107 and 108. As such, the interaction between resource domain controller 110, cross-point controller 109 and peripheral access controllers 104-105 will prevent access requests from data processors to peripheral devices that are not members of a common resource domain.

For example, requests to peripheral device 106 will be allowed when coming from data processor 101 because peripheral device 106 and data processor 101 are both members of the first resource domain. Access requests to peripheral device 106 will be prevented, however, when coming from data processor 102 because peripheral device 106 and data processor 102 are not members of a common resource domain. Similarly, access requests to peripheral device 107 will be allowed when coming from data processor 102 and prevented when coming from data processor 101. Access requests to peripheral device 108 will be allowed from both data processors 101 and 102 as peripheral device 108 is a member of both the first and the second resource domains.

Figure 4:
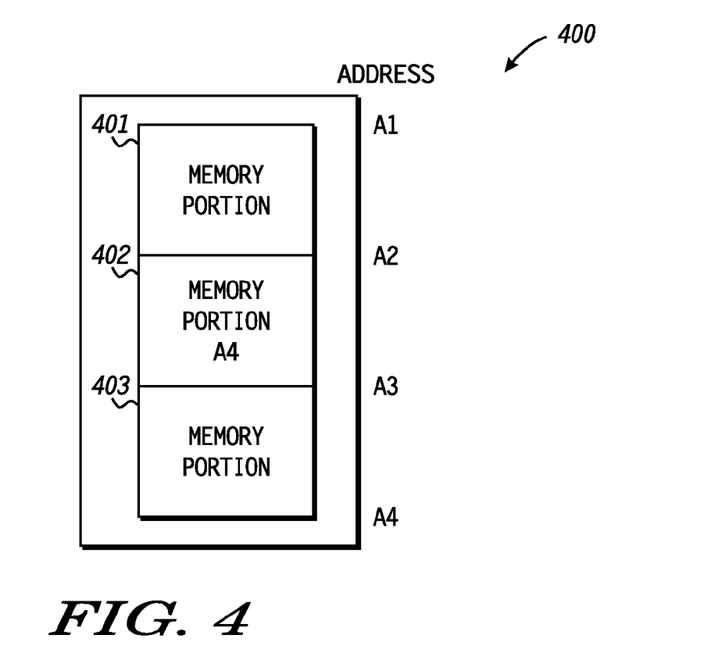
FIG. 4 illustrates a specific embodiment of a peripheral of FIG. 1 in accordance with the present disclosure.

In an embodiment of the present disclosure, a peripheral device can be partitioned to be treated as logically separate devices by a peripheral access controller. For example, FIG. 4 illustrates an embodiment of a memory element 400, which can be a specific embodiment of peripheral 108 that comprises memory partitions 401-403. According to an embodiment, a resource domain controller, such as that described in greater detail with reference to FIG. 5, can store resource domain information for each individual memory partition 401-403. For example, memory partition 401 can be assigned to be a member of a first resource domain, while memory partition 402 is not assigned to be a member of the first domain.

In an embodiment, the number of memory partitions can be variable in number and size. The size of the memory portions 401-403 are defined by the memory addresses of the beginning and ending locations of the portions in memory. Memory partition 401 begins at address A1 and includes memory locations having addresses less than or equal to A2. Memory partition 402 has a start address of A2 and includes memory locations with addresses greater than or equal to A2 and less than A3. Memory partition 403 includes memory locations with addresses greater than or equal to A3 and less than A4.

Figure 5:
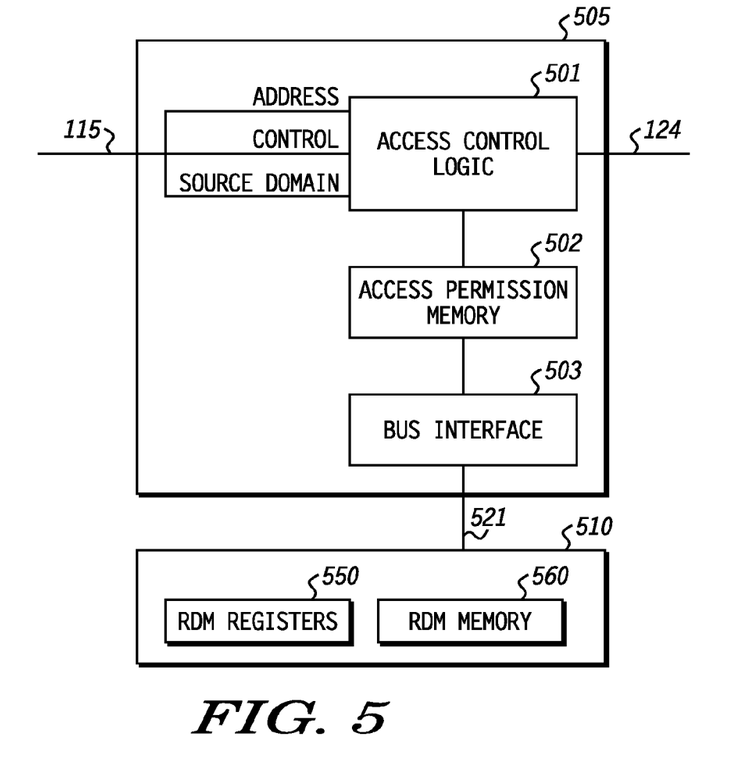
FIG. 5 illustrates a specific embodiment of a portion of FIG. 1 in greater detail.

FIG. 5 illustrates a peripheral access controller 505 and a resource domain controller 510 that are particular embodiments of peripheral access controller 105 and resource domain controller 110. Peripheral access controller 505 comprises access control logic 501, access permission memory 502 and bus interface 503.

In the embodiment of FIG. 5, instead of storing the resource domain information for the partitioned memories accessed via peripheral access controller 505 at registers 550 of resource domain controller 510, which are directly connected, field-by-field, to peripheral access controller 505, as disclosed in the embodiment of FIG. 3, the resource domain information is instead stored at memory 560 of the resource domain controller 510 and copied to storage locations local to the peripheral access controller 505 during configuration. For example, during configuration, the resource domain controller can copy the resource domain information stored at memory 560 to the access permission memory 502 via interconnect 521 and bus interface 503 using a plurality of write access transactions. Storing partition information and resource domain information at a location local to the peripheral access controller 505 allows for fewer conductive nodes between the resource domain controller 510 and the peripheral access controller 501 than using registers of the type previously described at FIG. 3. However, use of local memory to store the resource domain membership information creates special concerns during power down of the peripheral access control module that will be discussed in greater detail below.

Memory locations in access permission memory 502 can be registers that store resource domain information for each memory partition. In addition, the access permission memory 502 can include information defining each of the partitions 401-403 of FIG. 4. For example, Table 1, below, can represent register entries at access permission memory 502, wherein Location 0 can store the start address for memory portion 401, Location 1 can store the end address for memory portion 401, Location 2 can store domain membership information for the first portion, e.g., one field for each possible resource domain, and so on. Information for other memory portions and resource domains can be stored in a similar manner.

TABLE 1

Contents of Access Permission Memory 502

| Location | Data Function | Contents |
| --- | --- | --- |
| 0 | Portion 1 start address | A1 |
| 1 | Portion 1 end address | A2 |
| 2 | Portion 1 Resource Domain Membership | Membership Information |
| 4 | Portion 2 start address | A2 |
| 5 | Portion 2 end address | A3 |
| 6 | Portion 2 Resource Domain Membership | Membership Information |

During operation, peripheral access controller 505 receives access requests from cross-point controller 109. As described previously, the access requests received at a peripheral access controller 505 comprise CONTROL, ADDRESS, DATA and SOURCE DOMAIN information. Peripheral access controller 505 uses information stored at access permission memory 502 to determine whether to allow or prevent a particular access request. For example, the access control logic 501 can determine which memory partition is the target of an access request by comparing the ADDRESS of the access request with start and end addresses of the memory partition defined at the access permission memory 502. The memory partition with a start address less than or equal to the address being accessed, and an end address greater than the address being accessed, is the targeted memory partition. Peripheral access controller 505 can then read access permissions corresponding to the targeted memory from the access permission memory 502, and determine whether or not the target address partition belongs to the same resource domain as the access request, and allow or prevent the access request to continue, as appropriate.

Figure 6:
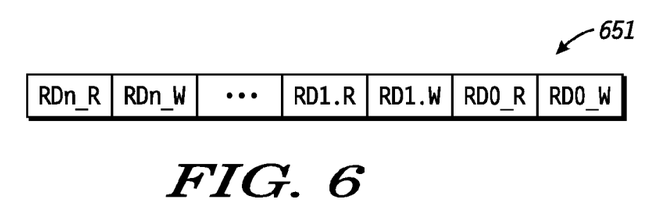
FIG. 6 illustrates a block diagram of a storage location for storing resource domain information in accordance with a particular embodiment.

In another embodiment, membership to specific resource domains can be further defined by access type to only allow access requests having a specific access type. For example, FIG. 6 illustrates a register 651 that includes separate read and write domain fields each resource domain, where RD0_R is the read domain field of resource domain RD0, and RD0_W is the write domain filed of resource domain RD0. During operation, a master having a resource domain membership that includes RD0_R but not RD0_W will only be able to read information those peripherals belonging to the read domain RD0_R. Similarly, a peripheral having a resource domain membership that includes RD0_R but not RD0_W will only be able to be read information from those peripherals belonging to the read domain RD0_R.

Figure 7:
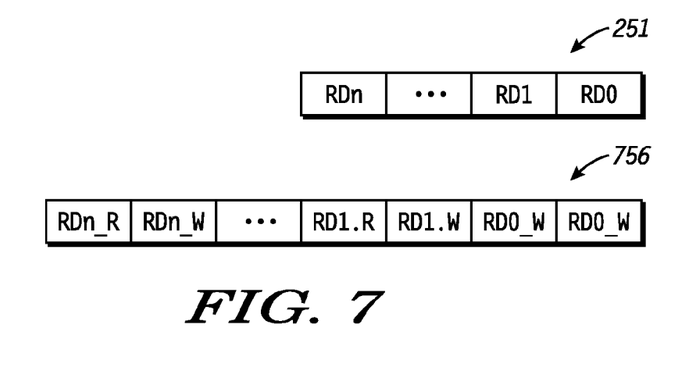
FIG. 7 illustrates a block diagram of storage locations for storing resource domain information in accordance with a particular embodiment.

In an alternate embodiment, illustrated at FIG. 7, the accessibility of a specific resource domain by access type can instead be globally defined, e.g., is defined in a manner that applies to all members of a particular resource domain. For example, a plurality of registers, including register 251, corresponds to the plurality of masters and peripherals, wherein each register of the plurality store information resource domain membership of its corresponding device as previously described at FIG. 2. A second set of information, which can be stored at the register 756, includes a plurality of field pairs that correspond to each domain, where each field pair can be programmed to indicate whether its corresponding resource domain can be read or written. For example, with respect to resource domain RD0, if field RD0_R is asserted, all read access requests within resource domain RD0 are permitted, while if field RD0_R is negated, no read access requests within resource domain RD0 are allowed. Similarly, with respect to resource domain RD0, if field RD0_W is asserted all write access requests within resource domain RD0 are permitted, while if field RD0_RW is negated no write access requests within resource domain RD0 are allowed.

Conceptually, the resource domain controller 109 can operate independently of the privilege modes of the data processors 101. Thus, privilege information provided by a data processor as part of an access request can be handled independent of the resource domain management techniques disclosed herein. For example, a domain RD0 access request to a peripheral that is not a member of domain RD0 will be prevented regardless of the priority level of the access request. Similarly, a domain RD0 access request to a peripheral that is a member of domain RD0 will be allowed to proceed by the resource domain controller, but can be subsequently prevented by circuitry that enforces privileged modes if requesting data processor did not have an adequate privilege level. For example, a lowest security level request to access a peripheral in a common resource domain will be denied if access of the peripheral requires a higher security level.

Figure 8:
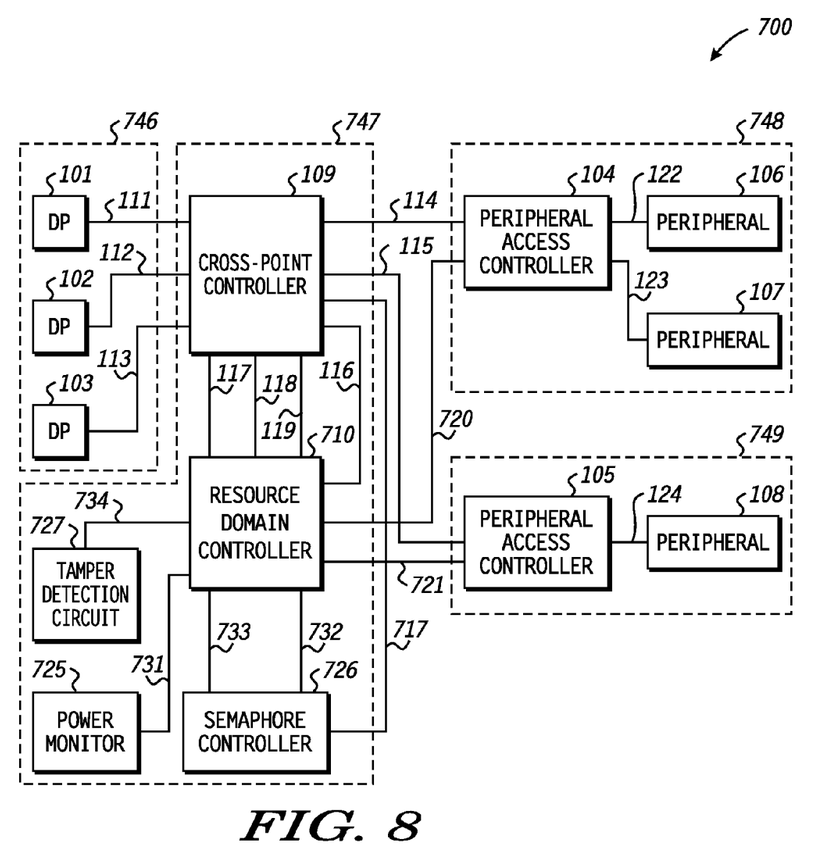
FIG. 8 illustrates a block diagram of a data processing system in accordance with a specific embodiment of the present disclosure.

FIG. 8 illustrates an embodiment of a data processing system 700 including various features described with respect to FIGS. 1, 3 and 5, which are similarly numbered. FIG. 7 further includes power monitor 725, semaphore controller 726, tamper detection circuit 727, and resource domain controller 710, which is an embodiment of resource domain controller 110. Tamper detection circuit 727 is connected to resource domain controller 710 via interconnect 734. Power monitor 725 is connected to resource domain controller 710 via interconnect 731. Semaphore controller 726 is connected to resource domain controller 710 via interconnects 732 and 733.

The modules of data processing system 700 are grouped into power domains 746-749. Power domain 746 includes data processors 101-103. Power domain 747 includes cross-point controller 109, resource domain controller 710, power monitor 725, semaphore controller 726 and tamper detection circuit 727. Resource domain controller 710 is connected to cross-point controller 109 via interconnect 116. Power domain 748 includes peripheral access controller 304 and peripheral devices 106-107, for which it controls access as described above. Power domain 749 includes peripheral access controller 505 and peripheral device 108.

Power can be applied to and removed from each power domain individually. For example, power can be applied to devices in power domain 747 whenever data processing system 700 operates, regardless as to whether power is supplied to power domains 748 and 749. Power can be applied to devices in power domain 748 when functionality of peripherals 106 or 107 is required and removed when the functionality is not required. By way of example, it is presumed power domain 747 is always powered.

Power monitor 725 detects and communicates any changes in the power status of power domains 746, 748 and 749 to resource domain controller 710 via interconnect 731. For example, power monitor 725 can determine a change in power state of power domains 748 and 749 by: monitoring control signals (not illustrated) of the power domains; directly monitor power being provided to the power domains; and the like.

The manner in which the resource domain controller 710 handles a change of power status for a particular peripheral access controller can vary depending upon the specific implementation of the peripheral access controller. For example, when power domain 748 powers down, the resource domain controller 710 can continue to drive the individual conductive nodes of interconnect 720 so that upon power up of domain 748 the resource domain information for peripherals 106 and 107 is immediately available for use by the peripheral access controller 104, thus maintaining integrity of the resource domain features described herein.

However, when power domain 749 powers down, the resource domain information for the partitions of memory at memory 108 will be lost by virtue of being stored in volatile memory local to the peripheral access controller 505. To ensure that access requests received after power is restored are qualified by a current set of resource domain information, the resource domain controller 710 provides a power-loss indicator at interconnect 721 that indicates a power loss has occurred. Assertion of the power-loss indicator can be maintained while the peripheral access controller 505 is powered down to assure that during power-up the peripheral access controller 505 can prevent any access requests at bus 115 from being serviced, by virtue of the power-loss signal being asserted.

The power monitor 725 detects the power-up of power domain 749 and notifies the resource domain controller 710, which in response will copy the resource domain information for peripheral 108, which is has been maintained in memory local to the resource domain controller 710, to the access permission memory 502 of the peripheral access controller 505, as previously described. Once the resource domain information has been copied back to the peripheral access controller 505, the resource domain controller 710 can remove the asserted power-loss indicator, which will allow processing of access requests by the peripheral access controller 505 when detected.

In an embodiment of the present disclosure, a semaphore controller can be used to limit access a peripheral device by data processors that belong to a specific resource domain, even though the peripheral belongs to multiple resource domains. Such a use of semaphores can be used to avoid data conflicts that can occur amongst domains.

Figure 9:
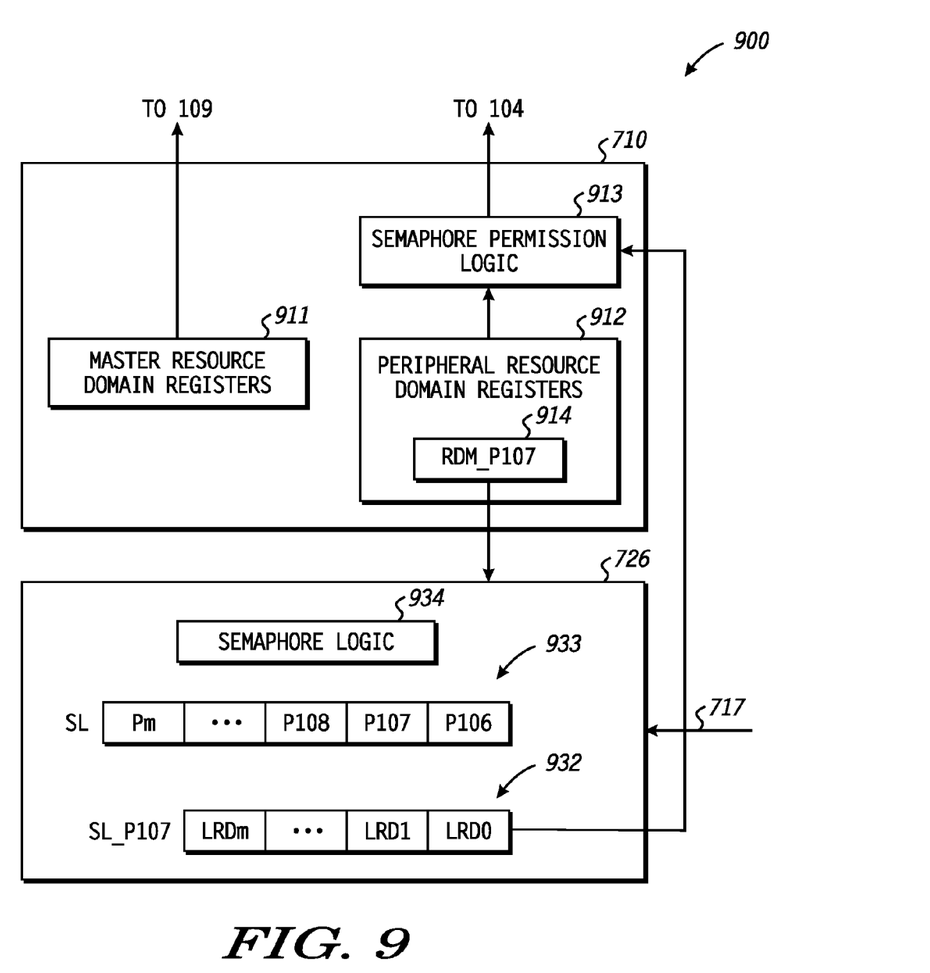
FIG. 9 illustrates a block diagram of a specific embodiment of a portion of the data processing system of FIG. 8.

FIG. 9 illustrates a particular embodiment of a resource domain controller 710 and a semaphore controller 726. Resource domain controller includes master resource domain registers 911, peripheral resource domain registers 912, and semaphore permission control logic 913. For convenience, an access permission memory of the type described at FIG. 5 is not specifically illustrated at FIG. 9. Master domain resource registers 911 can include registers, such as register 251 (FIG. 2), that store resource domain membership information for each data processor device. Peripheral domain resource registers 912 can include registers, such as registers 351 and 352 (FIG. 3), that store resource domain membership information for each peripheral device.

Semaphore controller 726 includes a Semaphore Lock (SL) register 726 having a plurality of fields corresponding to each peripheral device. An asserted field of register SL 726 indicates a domain has a semaphore lock on the corresponding peripheral. For example, when field P107 is asserted it is understood that a domain has acquired a semaphore lock on peripheral 107.

Semaphore controller 726 also includes a plurality peripheral specific semaphore lock registers corresponding to each peripheral. Specifically illustrated is register SL_P107, which corresponds to peripheral 107, and includes a plurality of fields (LRD0-LRDm) that correspond to the plurality of resource domains. At any given time, zero or one of the fields LRD0-LRDm can be asserted, wherein an asserted field indicates the particular domain that owns the semaphore lock of the peripheral. It will be appreciated, therefore, that if field P107 of register SL is asserted, indicating peripheral 107's semaphore is owned, there will be one field asserted in register SL_P107 indicating which domain owns the semaphore lock.

During operation, a bus master can request a semaphore lock by transmitting an access request to the semaphore controller 726 that identifies a peripheral for which the semaphore lock is being requested. It will be appreciated that the peripheral can be identified by an identifier known to the bus master, by an address that is translated by the cross point controller or semaphore controller to identify a particular peripheral, and the like. According to an embodiment where each master is only associated with one resource domain, the domain requesting the semaphore will be the domain to which the data processor belongs, as will be determined by the resource domain controller 710 in the manner previously described, and included with the down stream access request transmitted via interconnect 717.

Upon receiving an acquisition request via interconnect 717, the semaphore controller 726 will determine if the resource domain of the request is on a white list of domains that can acquire the lock. In an embodiment the domain white list is the same as the peripheral resource domain membership. Thus, the semaphore controller 726 can compare the resource domain membership information at register RDM_P107, e.g. the white list/domain membership of peripheral 107, to the resource domain of the acquisition access request, where the resource domain is determined based on SOURCE DOMAIN information (not shown) received via interconnect 117. If the peripheral is a member of the same domain as the acquisition request, the acquisition is possible and semaphore acquisition continues. Otherwise, the requesting data processor is not authorized to acquire the lock, and an error message can be returned.

Assuming the resource domain of the acquiring request is white listed, logic circuitry of semaphore controller 726 will determine if the requested peripheral semaphore lock is already owned. For example, if field P107 of register SL is asserted, the requested semaphore lock of peripheral 107 is already owned, and the acquisition request will fail. Alternatively, if field P107 of register SL is negated, the requested semaphore lock of peripheral p107 is available, and the acquisition request will proceed by asserting field P107 of register SL to indicate peripheral 107 is now locked. Field LRD1 of register SL_P107 is also asserted to indicate that domain RD1 owns the semaphore lock of peripheral 107.

Assuming an embodiment where a semaphore lock is required for a peripheral to be accessed, once a resource domain has acquired a semaphore lock for a peripheral, any access request associated with that domain can access the peripheral. For example, if in the above example, resource domain RD1 acquired the lock of peripheral 107, field LRD1 of register SL_P107 will be asserted indicating that only access requests from resource domain RD1 can access peripheral 107. Thus, the resource domain information that is provided via interconnect 320 from resource domain controller 710, and used by the peripheral access controller 104 to qualify access to peripheral 104, is based on the contents of register SL_P107, which by example indicates only accesses from resource domain RD1 are to be allowed, by virtue of the semaphore lock.

In an embodiment, the use of semaphores can be enabled or disabled, by a register for example. When semaphores are disabled, for the above example, the resource domain information provided by resource domain controller 710 to the peripheral access controller 104 would be the resource domain membership information stored at register RDM_P107, instead of the semaphore lock information stored at register SL_P107. Thus, it will be appreciated that the contents of RDM_P107 indicate the actual resource domain membership of a peripheral when semaphores are disabled, and indicate the white list of resource domains that can acquire the semaphore lock of peripheral 107 when semaphores are enabled.

According to an embodiment, such as the previously described example, a particular domain is required to own the semaphore lock of a peripheral before a master associated with that domain can access the peripheral. According to another embodiment, the semaphore lock is optional, wherein an access request to a peripheral will be allowed by the resource domain controller when the semaphore lock of a peripheral is not owned, so long as the access request and peripheral are belong to a common domain. According to an embodiment, a request to relinquish a semaphore lock can originate from any data processor that belongs to the resource domain owning the semaphore lock. In another embodiment, a request to release a semaphore lock must originate with the device that acquired the lock—even though other masters in the same domain can access the locked peripheral.

It will be appreciated that the resource domain membership of a particular peripheral constitutes a "white list" that identifies those resource domains that are permitted to own that peripheral's semaphore, and, therefore, change the state of the semaphore. Thus, the white list for peripheral 107, at register RDM_P107 of FIG. 9, can be the same as the resource domain membership information of peripheral P107 maintained at the resource domain controller 710.

Data processing system 700 includes a tamper detection circuit 727 to receive and respond to tamper events detected at various portions of data processing system 700. According to an embodiment, each data processor 101-103, each peripheral 106-108, and other portions of the system 700, can detect and report the occurrence of tamper events to the tamper detection circuit 727. Detected tamper events can also be of varying types and severity.

Examples of tamper events of various types include physical tamper events, software tamper events, parametric tamper events, and the like. A physical tamper event can be an event that results in some type of physical modification, such as physical tampering of a portion of a package. A software tamper event can include detection of an unexpected or unusual software condition, such as encountering an unexpected address range, data range, a watchdog condition, and the like. A parametric tamper event can include detection of an unexpected parametric condition, such as an extreme voltage, current, temperature, delay path, and the like.

Each tamper event type can be associated with a varying level of severity. For example: a watchdog error that occurs during execution a non-security sensitive task may have a lower severity level than a watchdog error that occurs during a security sensitive task; a unexpected voltage in a first range of a data processor may have a lower severity level than an unexpected voltage in a second range of the data processor; an unexpected voltage may represent a higher severity level at one device of system 700 than at another; and the like.

Thus, it will be appreciated that tamper detection circuit 727 can receive tamper detect information from one or more of the data processors and peripherals of system 700. The tamper detect information can identify the device where the event occurred, the type of event, the severity of the event, and the like. By way of example, it is presumed that tamper events are communicated to the tamper detection circuit 727 via a dedicated interconnect (not shown in FIG. 8), as will be better understood with reference to FIG. 10.

Figure 10:
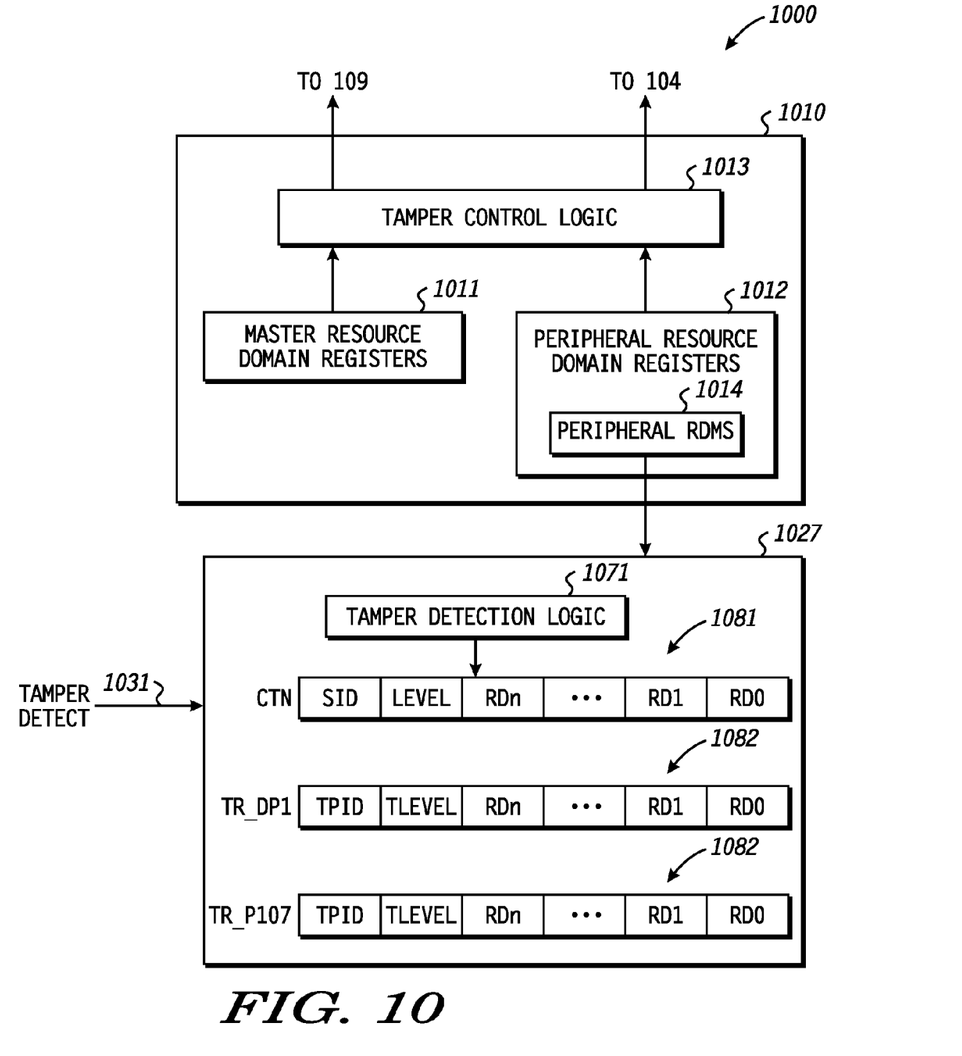
FIG. 10 illustrates a block diagram of a specific embodiment of a portion of the data processing system of FIG. 8.

FIG. 10 illustrates a particular embodiment of a resource domain controller 1010 and a tamper detection circuit 1027. Resource domain controller 1010 includes master resource domain registers 1011, peripheral resource domain registers 1012, and tamper control logic circuitry 1013. For convenience, an access permission memory of the type described at FIG. 5 is not specifically illustrated at FIG. 10. Master resource domain registers 1011 can include registers, such as register 251 (FIG. 2), that store resource domain membership information for each data processor 101-103. Peripheral domain resource registers 1012 can include registers, such as registers 351 and 352 (FIG. 3), that store resource domain membership information for each peripheral device 106-108.

Tamper detection circuit 1027 is an embodiment of tamper detection circuit 727, and includes a plurality of registers including registers 1081-1083, and tamper detection logic 1071 that can be circuitry that interfaces with the tamper control logic 1013 of resource domain controller 1010 to implement the functions described herein. An interconnect 1031 is connected tamper detection circuit 1027 to provide notification from various locations of tamper events. Each tamper notification can provide one or more of a source of the tamper event, a resource domain membership of the source, a type of tamper event, a severity of the tamper event and the like. Tamper control circuitry 1027 can store and report the received tamper event information. For example, the tamper control circuitry can report the tamper event information to one or more resources, such as one of the data processors. By way of example, it is presumed that each notification of a tamper event includes information that identifies at least a source device where the tamper event occurred and a severity of the tamper event.

In an embodiment, a source device provides a tamper detection indicator that includes an indication of severity. This tamper detection indicator can be provided to a port of the cross-point controller 109 that is dedicated to receiving tamper detection indicators from the particular source device (not illustrated), wherein the cross-point controller 109 can forward the severity indicator along with information identifying the source device, e.g., the cross-point port at which the tamper detect indicator was received, and the resource domain membership of the source device. The resource domain controller can provide this information using the resource domain look-up features previous described. In an alternate embodiment, the tamper detect information can be provided to the tamper detection logic without being routed through the cross-point. For example, each source device can have a dedicated connection at the tamper detection circuit 1027 that allows the tamper detection circuit to know which source device provided each received tamper notification, and based upon this information, the tamper detection logic can communicate with the resource domain controller 1010 to determine the resource domain information of the source device.

In response to receiving a tamper notification, the circuitry implementing the tamper detection logic 1071 will store information associated with the current tamper notification in register 1081, which includes fields labelled SID, LEVEL, and RDn-RD0. Field SID stores an indicator identifying the source of the tamper event. Field LEVEL stores an indicator identifying the severity level of the tamper event. Fields RDn-RD0 stores an indicator identifying the resource domain of the tamper event. For example, the each field of RDn-RD0 will be asserted that corresponds to a resource domain to which the source device belongs.

Tamper detection logic 1027 includes a plurality of tamper response registers corresponding to the plurality of peripherals and bus masters. According to an embodiment, each source device, e.g., peripheral and bus master, has one corresponding tamper response register. Register 1082 of FIG. 10, labeled TR_DP1, is an embodiment of a tamper response register that corresponds to data processor 101. Register 1083, labeled TR_P107, is an embodiment of a tamper response register that corresponds to peripheral 107. Each tamper response register is programmable and includes fields TPID, TLEVEL, and RDn-RD0. Field TPID is an indicator referred to as a "tamper policy identifier" that indicates a particular tamper policy to be implemented in response to a tamper event at device corresponding to the tamper response register. Field TLEVEL is an indicator that indicates a particular severity level threshold that must be associated with a tamper event in order for the indicated tamper policy to be executed. Fields RDn-RD0 indicate the resource domains to which the tamper policy applies. Operation of the tamper detection circuitry 1027 will be better understood with reference to registers TR_DP1 and TR_P107.

Upon receiving notification of a tamper event from data processor 101, the tamper detection logic 1071 evaluates register TR_DP1 to determine if a particular tamper policy is to be implemented. A particular policy, identified by field TPID, will be executed if the following conditions are met: 1). Data processor 101 is a member of a resource domain having its corresponding field RDn-RD0 asserted in register TR_DP1. For example, if data processor 101 is a member of only resource domain RD1, the tamper policy identified by field TPID will only be executed if field RD1 of register TP_DP1 is asserted. For peripherals, only one common resource domain field needs to be asserted. 2) The severity level of the tamper event is at equal to or greater than the severity level at field TLEVEL of Data processor 101. For example, if the field TLEVEL is set to a logic one, which represents a higher severity level than when set to a logic zero, the tamper policy identified by field TPID will only be executed if the current tamper event has a severity level of 1, as stored at field LEVEL of register CTN. In the event the field TLEVEL is set to a logic zero, the lowest severity level, all tamper events will meet this criteria. Register TR_P107 which corresponds to peripheral 107 has similar register as register TR_DP1.

When both of the above criteria are met, the indicated tamper policy will be executed. Table 2 includes a representative list of tamper policies. It will be appreciated that many other variations and combinations of policies are possible. In the below discussion, a master where a tamper event is detected is referred to as an "offending master", and a peripheral where a tamper event is detected is referred to as a "offending peripheral". The term "offending source" is intended to refer to either an offending master or an offending peripheral.

TABLE 2

Tamper Policies

| TPID | Policy Action (Offending Master) | Policy Action (Offending peripheral) |
|---|---|---|
| 0 | No action | No action |
| 1 | Prevent access requests by offending master; Allow all access requests by non-offending masters. | Prevent offending peripheral from being accessed. Allow other peripheral in RDx to be accessed. |
| 2 | Prevent peripherals belonging to RDx from being accessed by any master; | Prevent offending peripheral from being accessed. Prevent other peripheral in RDx to be accessed. |

As indicated in Table 2, Tamper policy 0 (TPID=0) when executed in response to an offending master or an offending peripheral implements no action in response to a tamper event.

In response to executing tamper policy 1, due to a tamper event at a bus master, all access requests from the offending master will be prevented. However, in this situation, tamper policy 1 allows access requests from all non-offending masters to proceed subject to the various resource domain conditions described herein. Thus, only the offending master is quarantined. According to an embodiment, tamper policy 1 can be implemented for offending bus masters by providing an invalid, or unused, resource domain identifier from the resource domain controller 1010 to the cross-point controller for each access request from the offending master, thus causing the peripheral access controllers to prevent all access requests originating at an offending master by virtue of such requests not having a common resource domain.

Tamper policy 1, due to a tamper event at a peripheral, results in all access requests to the offending peripheral from being accessed. However, tamper policy 1 in this situation allows access requests for non-offending peripherals to proceed, regardless of their resource domain membership, subject to the various resource domain conditions described herein. Thus, only the offending peripheral is quarantined.

In response to executing tamper policy 2, in response to a tamper event at a bus master, any access requests from the offending master will be prevented. In addition, this situation will prevent all access requests to any peripheral having a resource domain in common with the offending master. Thus, the offending master and all peripherals having a common resource domain with the offending master are quarantined. Tamper policy 2 can be implemented to prevent all access requests from offending bus masters as described above. In addition, tamper policy 2 can be implemented to prevent all access requests to peripherals having a common resource domain as the offending bus master by having the resource domain controller 1010 change the resource domain information that is provided to the peripheral access controllers for all peripherals to be quarantined. For example, the resource domain identifier, of each quarantined peripheral, that is provided to each peripheral access controller can be changed to an invalid, or unused, resource domain identifier. This will cause the peripheral access controllers to prevent all access requests to quarantined peripherals by virtue of the quarantined peripheral not having a common resource domain with any master.

Tamper policy 2, in response to a tamper event at a peripheral, results in all access requests to the offending peripheral from being accessed as described above. In addition, in this situation tamper policy 2 prevents access requests for non-offending peripherals that have a resource domain in common with the offending peripheral. Thus, the offending peripheral and peripherals having a resource domain in common with the offending peripheral are quarantined.

It will be appreciated that many different variations of implemented tamper policies are possible. For example, each peripheral could have multiple tamper response registers corresponding to multiple severity levels. For example, the use of multiple tamper response registers for data processor 101 could be used to execute one of two tamper policies based upon the value of TLEVEL stored at each respective register. In other embodiment, each tamper response register could include other field indicating which peripherals are to be quarantined in response to a particular tamper event. For example, tamper response registers for masters, such as TR_DP1, can include an additional set of fields QP106-QP108 corresponding to each peripheral that are used by a tamper policy to selectively quarantine each peripheral device. For example, a policy similar to tamper policy 1 would only quarantine peripherals having a domain in common with an offending bus master if its corresponding field in QP106-Q108 is asserted.

Figure 11:
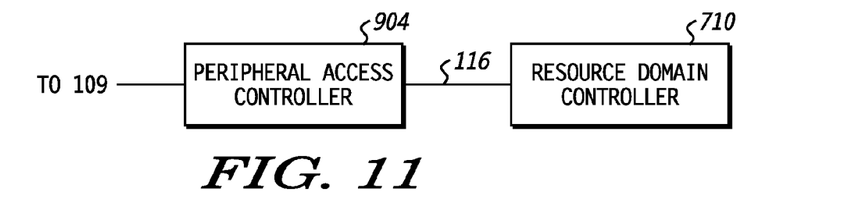
FIG. 11 illustrates a block diagram an embodiment of a portion of the data processing system of FIG. 8 in accordance with a particular embodiment.

FIG. 11 illustrates an embodiment where resource domain controller 710 is connected to peripheral access controller 901, which is itself connected to cross-point controller 109 as previously described. Peripheral access controller 904 can have an input, not shown, to receive domain membership information from resource domain controller 710, in a manner similar to that described herein for peripheral access controller 104 or 105. For example, access controller 904 can be a particular embodiment of peripheral access controller 104, which also supports peripherals 106 and 107, as illustrated at FIG. 1. Access by data processors to resource domain controller 710 can thus be controlled through the use of resource domains in a manner similar to peripheral devices 106-108. Upon application of power, resource domain controller 710 will group all data processors and peripheral devices in a single group as described with respect to FIG. 1, allowing initial configuration of resource domain controller 710 via peripheral access controller 901.

Figure 12:
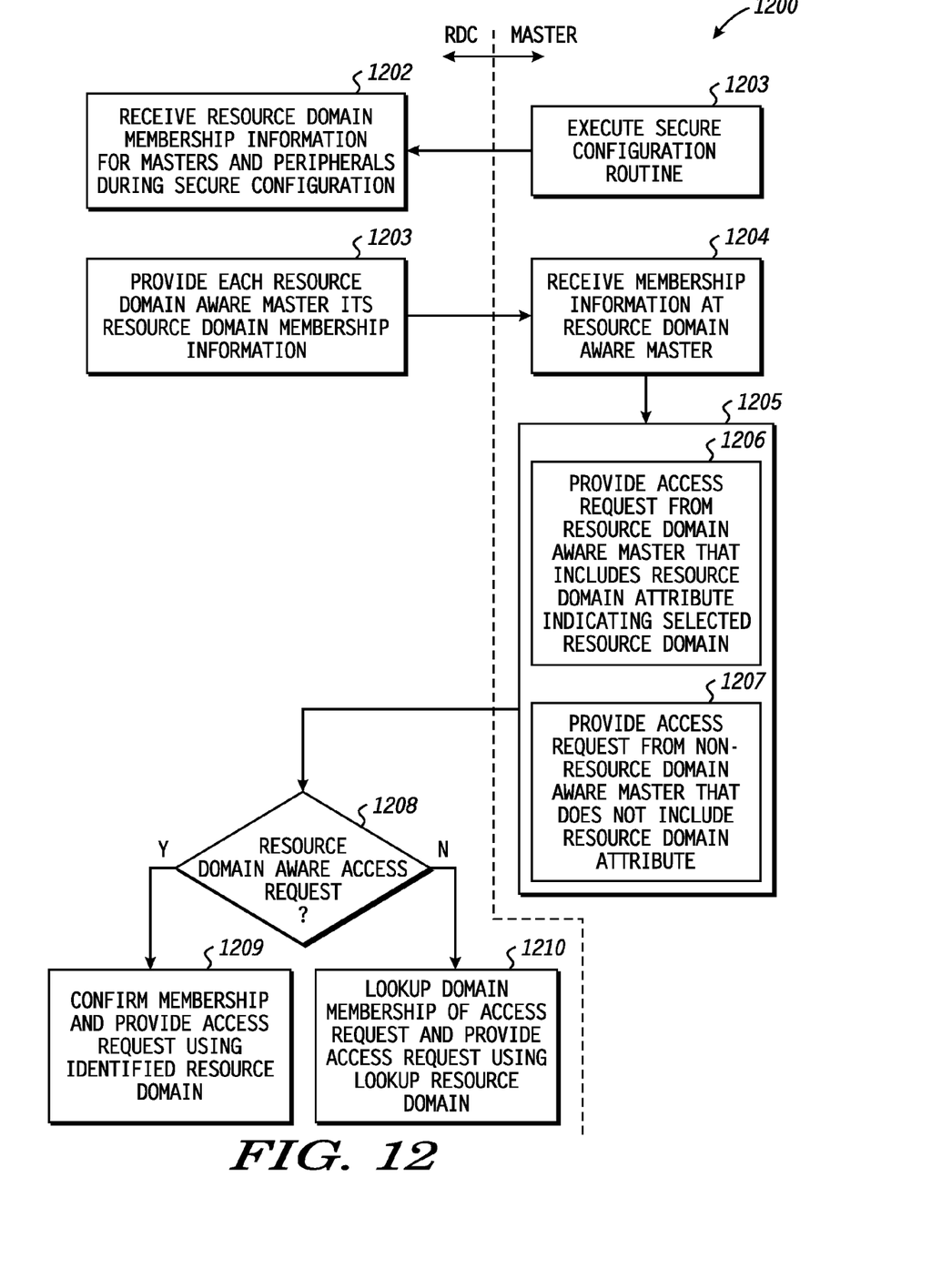
FIG. 12 illustrates a flow diagram of indicating how multiple access controllers can be accessed in accordance with a particular embodiment of the present disclosure.

FIG. 14 illustrates a method of another embodiment that allows data processors to select which resource domain amongst its membership resource domains a particular request is to be associated. Such a data processor that is capable selectively generating access from one of plurality of domains is referred to as a "resource domain aware data processor" or a "resource domain-aware master".

In FIG. 12, blocks to the left side of a dashed line represent operations that are associated with the resource domain controller features as described in various embodiments herein, while blocks to the right side of the dashed line represents operations that occur at a bus master, such as data processor 101.

At block 1201, system configuration occurs, during which a data processor of the system executes a secure program that programs the resource domain controller with the resource domain membership information for each master and peripheral, as previously described. At block 1202, the resource domain membership information is received and stored at the resource domain controller. Note that according to an embodiment, a default set of resource domain information will cause all data processors and peripherals to have a common resource domain.

At block 1203, the resource domain controller will provide each resource domain aware master information indicating the domains to which it is a member. At block 1204, the membership information is received and stored by each resource domain aware master.

Upon completion of configuration, flow proceeds to block 1205 where the various bus masters operate to implement their intended functions. Block 1205 includes sub-blocks 1206 and 1207. Block 1206 represents access requests that are processed by resource domain aware masters, while block 1207 represents access request provided by masters that are not resource domain aware.

At block 1208 it is determined whether each received access request is a from a resource domain aware master, e.g., a resource domain aware access request, or not. Those access requests that are not resource domain aware access requests come from block 1207, and are processed by block 1209. Those access requests that are resource domain aware access requests come from block 1206, and include an attribute that indicates which resource domain the requested master was operating in when the access request was generated.

Access requests received from masters that are not resource domain aware will themselves not be resource domain aware. Non-resource domain aware instructions are handled in the manner previously described, wherein resource domain information will be determined and included in a downstream request provided to a peripheral access controller as indicated at block 1209.

Access requests received from masters that are resource domain aware come from block 1206, and include an attribute that indicates which resource domain the access request is associated. These access requests are processed by the resource domain controller and associated circuitry as indicated at block 1210. In particular, the resource domain controller can first confirm the resource domain of the access request, by verifying that the master providing the access request is a member of the resource domain identified by the requesting master. If it is determined that the resource domain of the access request is not valid, the access request will not be allowed to complete successfully. If it is determined that the resource domain of the access request is valid for its master, the access request can be forwarded downstream to the peripheral access controller along with its resource domain attribute provided by the master for handling as previously described. By handling access requests in the manner indicated at FIG. 12, both data processors capable that are capable of being resource domain aware and data processors that are not capable of being resource domain aware can be supported by the techniques described herein. It will be appreciated, in an embodiment, the resource domain controller system will need to maintain information that indicates whether or not its various ports connected to masters are expected to receive resource domain aware access requests. For example, each crossbar port connected to a master can be associated with a particular register field that indicates whether or not an access requests received at that port will receive a domain attribute. Note, in a particular embodiment, resource domain aware access requests can be treated as non-aware resource domain access requests by identifying a port receiving resource domain aware requests as a port that is receiving non resource domain aware requests.

In the foregoing specification, principles of the disclosure have been described with reference to specific embodiments with sufficient detail that would be readily implemented in logic circuitry or code by one of ordinary skill in the art. However, one of ordinary skill in the art appreciates that one or more modifications or one or more changes can be made to any one or more of the embodiments without departing from the scope of the invention as set forth in the claims below. For example, while particular implementations for responding to power monitoring, tamper detection, and semaphore acquisitions have been disclosed, it will be appreciated that embodiments omitting one or more of the controllers or including other features can be readily constructed using the principles disclosed herein.

Various data processors, peripherals, and access request are referred to herein as being assigned to resource domains. It will be appreciated that a data processor can be assigned to a resource domain with out having a priori knowledge of its assignment. For example, in an embodiment of the disclosed embodiment, a resource domain controller maintains a resource domain membership for each of the master ports of a cross-point controller, e.g., those ports that are connected to device that can act as a bus master. Therefore, when it is said that a data processor is assigned to a resource domain membership, it will be understood that that assignment is by virtue of the data processor being connected to a master port of the cross-point controller. Assigning data processors to resource domains in this manner is advantageous in that pre-existing data processors can take advantage of the resource domain techniques disclosed herein without being modified.

What is claimed is:

1. A method, comprising:
assigning, by a resource domain controller, a plurality of bus masters to corresponding at least one resource domain of a plurality of resource domains, including assigning a first bus master of the plurality of bus masters to a first at least one resource domain;
assigning, by the resource domain controller, a first peripheral to a second at least one resource domain of the plurality of resource domains;
receiving at a first peripheral access control module a first access request from the first bus master to access the first peripheral, the first access request comprising a resource domain identifier that is indicative of the first at least one resource domain;
receiving, from the resource domain controller, a first peripheral resource domain indicator at the first peripheral access control module indicating the second at least one resource domain is assigned to the first peripheral; and
allowing the first access request in response to determining at the first peripheral access control module that the first at least one resource domain and the second at least one resource domain have a common resource domain, otherwise, preventing the first access request in response to determining at the first peripheral access control module that the first at least one resource domain and the second at least one resource domain do not have a common resource domain;
subsequent to receiving the first peripheral resource domain indicator, removing power from the first peripheral access control module while maintaining power to the resource domain controller;
subsequent to removing the power from the first peripheral access control module, restoring power to the first peripheral access control module; and
in response to restoring the power, preventing the access requests until the first peripheral resource domain identifier being received at the first peripheral access control module.

2. The method of claim 1, further comprising:
in response to receiving the first peripheral resource domain identifier, storing the first peripheral resource domain identifier at a volatile storage location local to the first peripheral access control module.

3. The method of claim 1 further comprising:
programming the resource domain controller to store resource domain information that indicates the first bus master is a member of the first at least one resource domain and that the first peripheral is a member of the second at least one resource domain.

4. A method, comprising:
assigning, by a resource domain controller, a plurality of bus masters to corresponding at least one resource domain of a plurality of resource domains, including assigning a first bus master of the plurality of bus masters to a first at least one resource domain;
assigning, by the resource domain controller, a first peripheral to a second at least one resource domain of the plurality of resource domains;
receiving at a first peripheral access control module a first access request from the first bus master to access the first peripheral, the first access request comprising a resource domain identifier that is indicative of the first at least one resource domain;
receiving, from the resource domain controller, a first peripheral resource domain indicator at the first peripheral access control module indicating the second at least one resource domain is assigned to the first peripheral; and
allowing the first access request in response to determining at the first peripheral access control module that the first at least one resource domain and the second at least one resource domain have a common resource domain, otherwise, preventing the first access request in response to determining at the first peripheral access control module that the first at least one resource domain and the second at least one resource domain do not have a common resource domain; and
subsequent to receiving the first peripheral resource domain indicator, removing power from the first peripheral access control module while maintaining power to the resource domain controller, and continuing to provide the first peripheral resource domain indicator to the first peripheral access control module from the resource domain controller while power is removed from the first peripheral access control module.

5. A method, comprising:
assigning, by a resource domain controller, a plurality of bus masters to corresponding at least one resource domain of a plurality of resource domains, including assigning a first bus master of the plurality of bus masters to a first at least one resource domain;
assigning, by the resource domain controller, a first peripheral to a second at least one resource domain of the plurality of resource domains;
receiving at a first peripheral access control module a first access request from the first bus master to access the first peripheral, the first access request comprising a resource domain identifier that is indicative of the first at least one resource domain;

receiving, from the resource domain controller, a first peripheral resource domain indicator at the first peripheral access control module indicating the second at least one resource domain is assigned to the first peripheral; and allowing the first access request in response to determining at the first peripheral access control module that the first at least one resource domain and the second at least one resource domain have a common resource domain, otherwise, preventing the first access request in response to determining at the first peripheral access control module that the first at least one resource domain and the second at least one resource domain do not have a common resource domain; and after applying power to the resource domain controller, and prior to programming any resource domain information at the resource domain controller, allowing the first bus master to access the first peripheral.

6. The method of claim 5, wherein the first peripheral is accessible at a plurality of addresses and only a portion of the plurality of addresses are assigned to the second at least one resource domain.

7. The method of claim 5, wherein the first peripheral is accessible at a plurality of addresses, wherein each one of the plurality of addresses is assigned to the second at least one resource domain.

8. A method, comprising:
assigning, by a resource domain controller, a plurality of bus masters to corresponding at least one resource domain of a plurality of resource domains, including assigning a first bus master of the plurality of bus masters to a first at least one resource domain;

assigning, by the resource domain controller, a first peripheral to a second at least one resource domain of the plurality of resource domains;

receiving at a first peripheral access control module a first access request from the first bus master to access the first peripheral, the first access request comprising a resource domain identifier that is indicative of the first at least one resource domain;

receiving, from the resource domain controller, a first peripheral resource domain indicator at the first peripheral access control module indicating the second at least one resource domain is assigned to the first peripheral; and allowing the first access request in response to determining at the first peripheral access control module that the first at least one resource domain and the second at least one resource domain have a common resource domain, otherwise, preventing the first access request in response to determining at the first peripheral access control module that the first at least one resource domain and the second at least one resource domain do not have a common resource domain;

detecting a tamper event at the first bus master;
receiving a second access request from a second bus master to access the first peripheral subsequent to detecting the tamper event, the second access request having at least one resource domain in common with the first peripheral, and having no resource domain in common with the first bus master;

selecting one of a first tamper policy or a second tamper policy;

in response to the first tamper policy being selected, preventing the second access request in response to detecting the tamper event; and in response to the second tamper policy being selected, allowing the second access request in response to second tamper event in light of detecting the tamper event.

9. A method, comprising:
assigning, by a resource domain controller, a plurality of bus masters to corresponding at least one resource domain of a plurality of resource domains, including assigning a first bus master of the plurality of bus masters to a first at least one resource domain;

assigning, by the resource domain controller, a first peripheral to a second at least one resource domain of the plurality of resource domains;

receiving at a first peripheral access control module a first access request from the first bus master to access the first peripheral, the first access request comprising a resource domain identifier that is indicative of the first at least one resource domain;

receiving, from the resource domain controller, a first peripheral resource domain indicator at the first peripheral access control module indicating the second at least one resource domain is assigned to the first peripheral; and allowing the first access request in response to determining at the first peripheral access control module that the first at least one resource domain and the second at least one resource domain have a common resource domain, otherwise, preventing the first access request in response to determining at the first peripheral access control module that the first at least one resource domain and the second at least one resource domain do not have a common resource domain;

detecting a tamper event at the first peripheral;
receiving, subsequent to detecting the tamper event, a second access request from the first bus master to access a second peripheral belonging to the second at least one resource domain;

selecting one of a first tamper policy and second tamper policy;

in response to the first tamper policy being selected, preventing the second access request in response to the first and second peripherals having a resource domain in common; and in response to the second tamper policy being selected, allowing the second access request despite the first and second peripherals having a resource domain in common.

10. A method, comprising:
assigning, by a resource domain controller, a plurality of bus masters to corresponding at least one resource domain of a plurality of resource domains, including assigning a first bus master of the plurality of bus masters to a first at least one resource domain;

assigning, by the resource domain controller, a first peripheral to a second at least one resource domain of the plurality of resource domains;

receiving at a first peripheral access control module a first access request from the first bus master to access the first peripheral, the first access request comprising a resource domain identifier that is indicative of the first at least one resource domain;

receiving, from the resource domain controller, a first peripheral resource domain indicator at the first peripheral access control module indicating the second at least one resource domain is assigned to the first peripheral; and allowing the first access request in response to determining at the first peripheral access control module that the first at least one resource domain and the second at least one resource domain have a common resource domain, otherwise, preventing the first access request in response to determining at the first peripheral access control module that the first at least one resource domain and the second at least one resource domain do not have a common resource domain;

receiving, at a semaphore control module, a request to acquire a semaphore lock that restricts access to the first peripheral by access requests belonging to a particular resource domain; and determining at the semaphore module to grant the semaphore lock in response to determining that the particular resource domain is a member of the second at least one resource domain.

11. The method of claim 10, wherein, in response to granting the semaphore lock, communicating information from the resource domain controller to the first peripheral access control module to enforce the semaphore lock; and while the semaphore lock is pending, determining at the first peripheral access control module to allow the first access request to proceed in further response to determining that the first at least one resource domain includes the particular resource domain.

12. A data processing device comprising:
a peripheral;
a data processor having a first port to provide a first access request requesting access of the peripheral;
a resource domain controller comprising a first output to provide an indicator of a first at least one resource domain, of a plurality of resource domains, of the data processor, and a second output to provide an indicator of a second at least one resource domain, of the plurality of resource domains, of the peripheral;
a first access control module having a first input coupled to the first port of the data processor and to the first output of the resource domain controller to receive the first access request and the indicator of the first at least one resource domain, and a second input coupled to the second output of the resource domain controller to receive the indicator of the second at least one resource domain, the first access control module adapted to determine, based on the first at least one resource domain and the second at least one resource domain, whether the peripheral and the data processor are members of a common resource domain, and in response to determining the peripheral and data processor are members of the common resource domain, to allow the first access request to proceed, otherwise, to prevent the first access request, wherein the resource domain controller is further adapted to communicate resource domain information to the first access control module in response to power being applied to the first access control module subsequent to power being removed from the first access control module.

13. The data processing device of claim 12, wherein the first access control module further comprises a local memory to store information indicative of the second at least one resource domain.

14. The data processing device of claim 12, further comprising:

a tamper detection module adapted to detect tampering with the data processing device and to communicate an indication of an occurrence of the tampering to the resource domain controller, the resource domain controller further adapted to prevent accesses to the peripheral in response to the security violation indication.

15. A data processing device comprising:
a peripheral;
a data processor having a first port to provide a first access request requesting access of the peripheral;
a resource domain controller comprising a first output to provide an indicator of a first at least one resource domain, of a plurality of resource domains, of the data processor, and a second output to provide an indicator of a second at least one resource domain, of the plurality of resource domains, of the peripheral;
a first access control module comprising a first input coupled to the first port of the data processor and to the first output of the resource domain controller to receive the first access request and the indicator of the first at least one resource domain, a second input coupled to the second output of the resource domain controller to receive the indicator of the second at least one resource domain, and a local memory configured to store information indicative of the second at least one resource domain, wherein
the first access control module is adapted to determine, based on the first at least one resource domain and the second at least one resource domain, whether the peripheral and the data processor are members of a common resource domain, and in response to determining the peripheral and data processor are members of the common resource domain, to allow the first access request to proceed, otherwise, to prevent the first access request,
the resource domain controller further comprises a third output coupled to a second input of the first access control module to provide a power-loss indicator, and
in response to the power-loss indicator the first access control module is adapted to prevent access requests to the peripheral until the information indicative of the second at least one resource domain has been stored at the local memory.

16. The data processing device of claim 15, wherein the peripheral is accessible at a plurality of addresses.

17. The data processing device of claim 15, wherein the resource domain controller further comprises a third output to provide information identifying the second at least one resource domain; and the device further comprises:
a second access control module having a first input coupled to the first port of the data processor and to the first output of the resource domain controller to receive a second access request and the indication of the first at least one resource domain, and a second input coupled to the third output of the resource domain controller to receive the information identifying the second at least one resource domain, the second access module adapted to determine, based on the first at least one resource domain and the second at least one resource domain, whether the peripheral and the data processor are members of a common resource domain, and in response to determining the peripheral and data processor are a members of the common resource domain, to allow the access request to proceed, otherwise, to prevent the access request.

* * * * *